Oct. 30, 1923.

J. R. JANNELLE
POTATO DIGGER
Filed Nov. 11, 1920

Inventor
J. Romuald Janelle
By William C. Sinton
Attorney

Oct. 30, 1923.

J. R. JANNELLE 1,472,300

POTATO DIGGER

Filed Nov. 11, 1920

Inventor
J. Romuald Janelle

By William Clinton
Attorney

Patented Oct. 30, 1923.

1,472,300

UNITED STATES PATENT OFFICE.

JOSEPH ROMUALD JANNELLE, OF THREE RIVERS, QUEBEC, CANADA.

POTATO DIGGER.

Application filed November 11, 1920. Serial No. 423,391.

*To all whom it may concern:*

Be it known that I, JOSEPH ROMUALD JANNELLE, a subject of the King of Great Britain, residing at Three Rivers, Province of Quebec, Canada, have invented certain new and useful Improvements in Potato Diggers; and I do hereby declare that the following is a full, clear, and exact description of the invention, such as will enable others skilled in the art to which it appertains to make and use the same.

The present invention relates to new and useful improvements in farm implements and more particularly to a machine for digging potatoes and other like vegetables.

The primary object of the invention is the provision of a machine such as above noted which includes means for removing the potatoes or the like from the earth and also removing the dirt and other foreign particles therefrom.

Another object of the invention is the provision of means for conveying the potatoes from the shovel to a conveyor and during such movement to remove the earth therefrom.

A still further object of the invention is the provision of a potato digging machine such as above referred to, which will be comparatively simple and inexpensive to manufacture, reliable and efficient in use, and readily operated.

With the above and other objects in view, the present invention resides in the novel features of construction, formations, combinations, and arrangements of parts to be hereinafter more fully described, claimed, and illustrated in the accompanying drawings forming a part of the present invention and in which:

Figure 1:
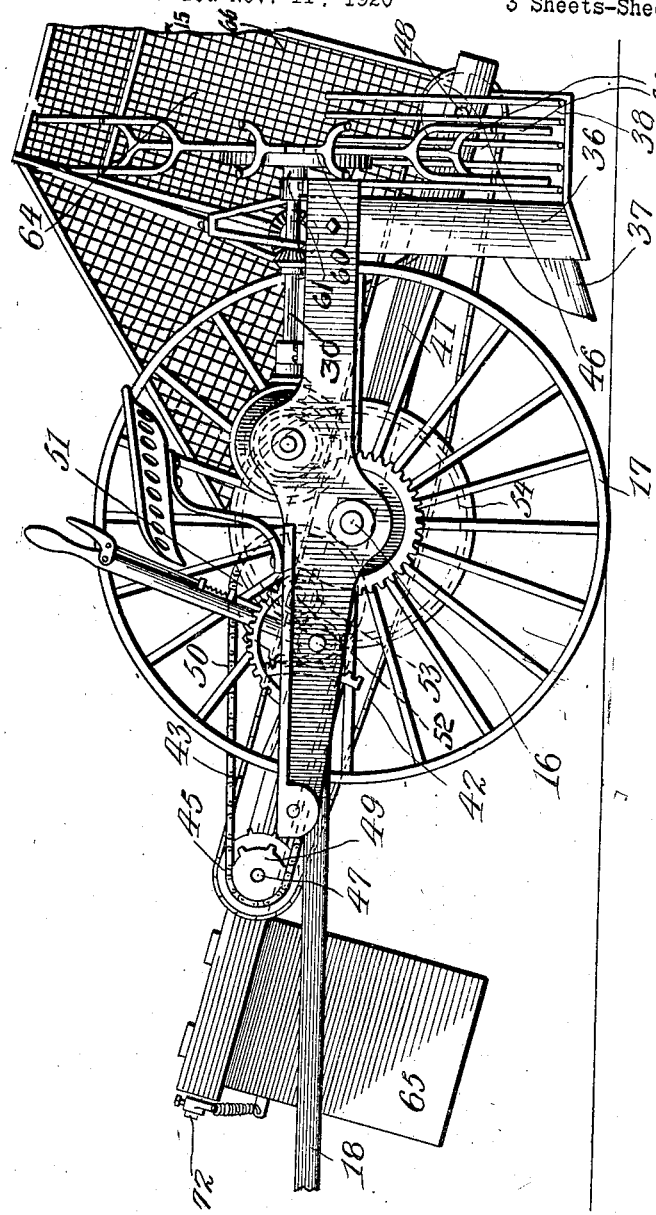
Figure 1 is a side elevation of the invention.

Referring now to the accompanying drawings by corresponding characters of reference throughout the several views, the numeral 15 denotes in general my improved machine which comprises a rotatable axle 16 to which are keyed the main or drive wheels 17 which are two in number and spaced a sufficient distance apart to effectively balance the machine.

A tongue is shown at 18 and has connected thereto the usual draft attachments 19 by means of which horses or other suitable draft animals or appliances can be connected for the purpose of propelling the machine during its operation.

A frame 20 is hingedly secured at 21 to the axle 16 substantially intermediate the wheels 17.

A depending frame 36 is carried by the rear extremity of the tilting frame 20 and carries at its lower end a shovel 37 which is adapted to enter the earth digging up the potatoes or the like therefrom.

A transverse rack 38 including spaced parallel bars 39 is connected at one end to the frame 36 extending in the rear of the shovel and adapted to receive the potatoes removed from the ground thereby. The opposite end of the rack 38 extends to the conveyor frame 40 which comprises a pair of spaced bars 41 between which is mounted an endless conveyor 42 which comprises a chain 43 connected by the transverse slats 44. The chain 43 engages the sprocket wheels 45 and 46 mounted on the transverse shafts 47 and 48 respectively, which are journalled in the bars 41.

Figure 2:
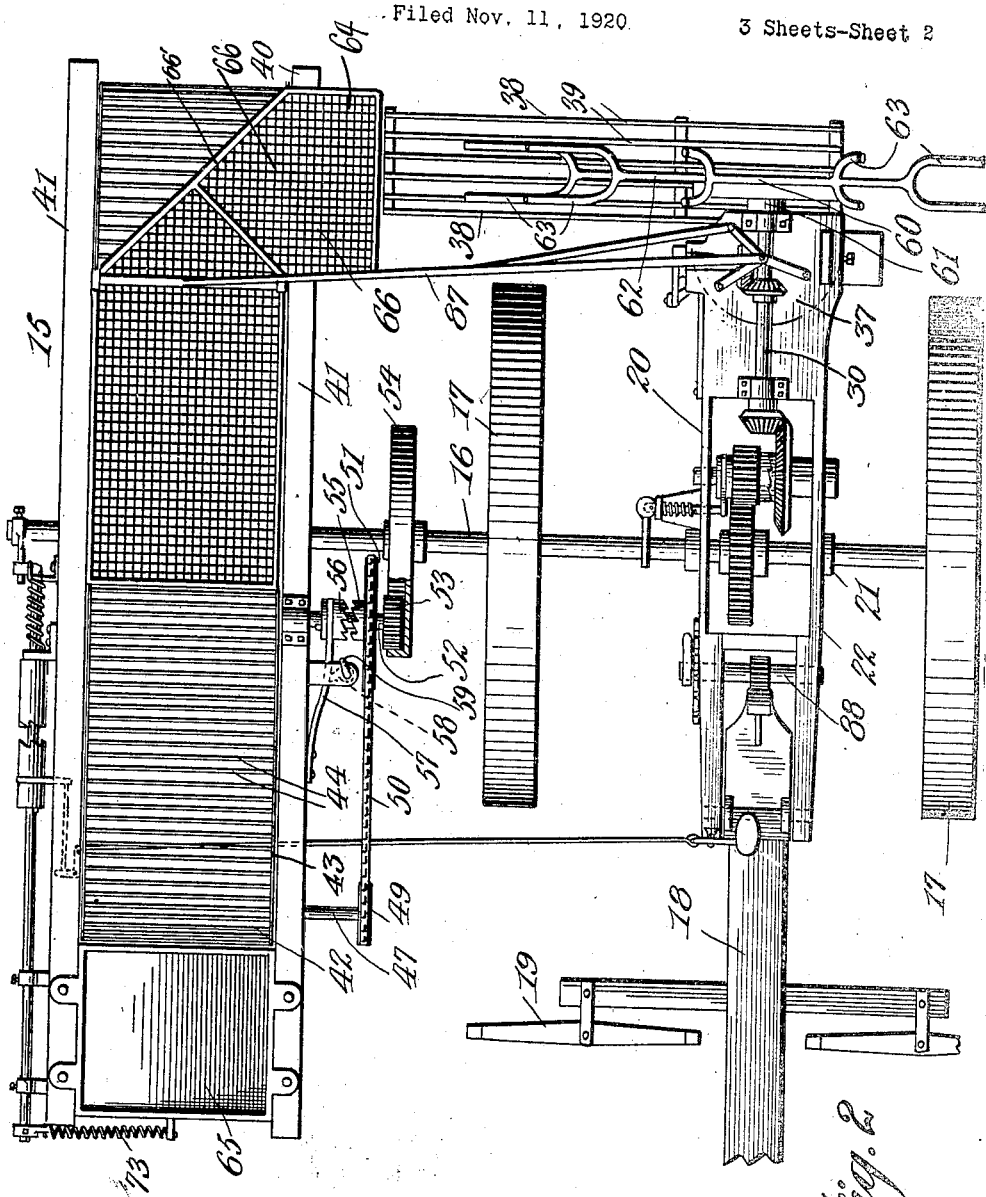
Figure 2 is a top plan view thereof.
Figure 3:
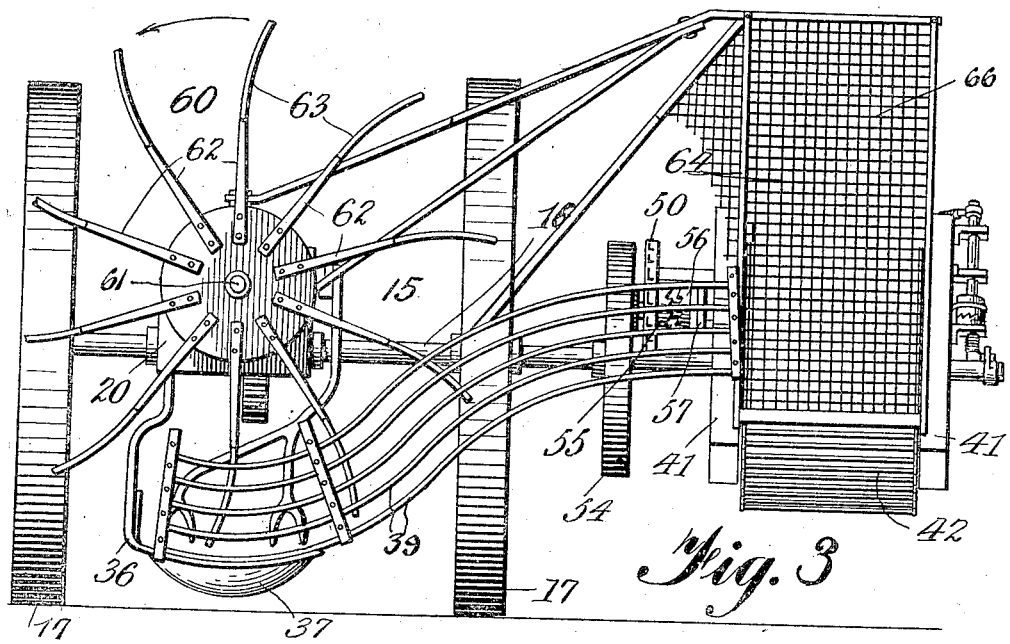
Figure 3 is an end view thereof.

The shaft 47 has secured to its inner end an additional sprocket wheel 49 over which passes a sprocket chain 50 by means of which the said conveyor is operated. The other end of the chain 50 passes over a sprocket wheel 51 which is loosely mounted on a shaft 52 to the inner end of which is keyed a pinion 53 which meshes with the internal toothed gear 54 keyed to the axle 16. The outer face of the sprocket wheel 51 is provided with a clutch element 55 designed to be engaged by a clutch element 56 normally forced into engagement therewith by means of a spring 57. A cam 58 actuated by a lever 59 is designed to engage the spring 57 for the purpose of forcing the clutch elements 55 and 56 out of engagement. The clutch element 56 is slidably keyed to the shaft 52 and when these said elements 55 and 56 are in spaced relation or out of engagement, as shown in Figure 2, the rotation of the shaft 52 has no effect on the loose sprocket wheel 51 and consequently the conveyor 42 is thrown out of engagement. When, however, the elements 55 and 56 are thrown into engagement, the sprocket wheel 51 will be rotated which imparts its motion through the chain 50 to the sprocket wheel 49 and the shaft 47 to which the sprocket wheel is keyed, which obviously causes the conveyor to move in a forward direction.

A fork is shown at 60 and includes a hub 61 keyed to the rear end of the shaft 30 which receives motion from the axle 16. A plurality of radial arms 62 extend from the hub. The terminals of these arms are forked as at 63 and these forks pass between the bars 39 striking the potatoes, knocking the particles of earth therefrom and driving them into the cage 64 from whence they will be directed to the upper lap of the conveyor and move forwardly into the container 65 mounted between the forward ends of the bars 41. The cage 64 may be made of any desired material such as the reticulated screens 66 which are positioned at the rear, the sides and above the rear portion of the conveyer for preventing the potatoes from falling therefrom. It covers the meeting ends of the rack 38 and conveyor 42, and includes a back wall 66' between its branches. This back is inclined to the direction of travel of both the rack and conveyor, so that material delivered thereagainst will not rebound to the rack but will be deflected to the conveyor.

From the foregoing description, taken in connection with the accompanying drawings, it will be manifest that a potato digging machine is provided which will fulfill all of the necessary requirements of such a device, and it should be understood in this connection that various minor changes in the specific details of construction can be resorted to within the scope of the appended claim, without departing from the spirit or sacrificing any of the advantages of the invention.

Having thus fully described the invention, what I claim as new and desire to protect by Letters Patent is:—

A digger comprising a wheeled frame, a rack supported transversely at the rear end of the frame, a conveyor extending longitudinally of the frame and having one end disposed adjacent one end of the rack, a shovel supported by the frame in proximity to the remaining end of the rack and adapted to discharge therein, a rotatable member cooperating with said rack and said last named end for moving the contents discharged from the shovel along the rack to the conveyor, a cage covering the meeting ends of the rack and conveyor, said cage including a back wall inclined to the direction of travel of both the rack and conveyor.

In witness whereof I have hereunto set my hand.

JOSEPH ROMUALD JANNELLE.